United States Patent [19]

Marquet et al.

[11] Patent Number: 5,086,235
[45] Date of Patent: Feb. 4, 1992

[54] POWER SUPPLY SWITCHOVER DEVICE FOR ELECTRICAL APPARATUS AND TELEACTION TERMINAL EQUIPPED THEREWITH

[75] Inventors: Alain Marquet, Lardy; Jacques Tanguy, Antony, both of France

[73] Assignee: Alcatel Cit, Paris, France

[21] Appl. No.: 457,071

[22] Filed: Dec. 26, 1989

[30] Foreign Application Priority Data

Dec. 26, 1988 [FR] France ................... 88 17183

[51] Int. Cl.$^5$ ............................................. H02J 9/00
[52] U.S. Cl. ......................................... 307/64; 307/85
[58] Field of Search ................ 307/64, 66, 85, 86, 307/87

[56] References Cited

U.S. PATENT DOCUMENTS

| | | | |
|---|---|---|---|
| 4,354,118 | 10/1982 | Spencer | 307/66 |
| 4,560,841 | 12/1985 | Pierrel | 379/413 |
| 4,647,787 | 3/1987 | Pommer, II | 307/66 |
| 4,677,311 | 6/1987 | Morita | 307/66 |
| 4,779,007 | 10/1988 | Schlanger et al. | 307/66 |
| 4,807,102 | 2/1989 | Serras-Paulet | 307/64 |
| 4,851,756 | 7/1989 | Schaller et al. | 307/66 |

FOREIGN PATENT DOCUMENTS

0225231 6/1987 European Pat. Off. .

OTHER PUBLICATIONS

Electronic Engineering, vol. 51, No. 624, Jun. 1979, London, Great Britain, T. Austin, "No-Break Battery Back-Up with Automatic Shut-Off".

*Primary Examiner*—A. D. Pellinen
*Assistant Examiner*—Jeffrey A. Gaffin
*Attorney, Agent, or Firm*—Sughrue, Mion, Zinn, Macpeak & Seas

[57] ABSTRACT

A power supply switchover device is provided for electrical apparatus such as teleaction terminal equipment. A switching circuit puts a storage battery into and out of use by connecting it to at least one supply terminal of the electrical apparatus to which another source is also connected. A control circuit causes the switching circuit to connect the storage battery when the supply terminal falls to a predetermined potential as furnished by the power supply, and a blocking circuit acts on the control circuit to initiate disconnection of the storage battery, when and as long as said terminal is at a potential that is lower than a determined threshold value.

6 Claims, 2 Drawing Sheets

POWER SUPPLY SWITCHOVER DEVICE FOR ELECTRICAL APPARATUS AND TELEACTION TERMINAL EQUIPPED THEREWITH

BACKGROUND OF THE INVENTION

1. Field of the invention

The invention relates to a power supply switchover device for electrical apparatus that associates a storage battery and another source of electrical power which the storage battery is adapted to temporarily replace or interface, as well as to teleaction terminal equipment fitted with a power supply switchover device of this type.

Many items of electrical apparatus are provided with an auxiliary or main power supply operating on the basis of a storage cell or battery, frequently incorporated into the apparatus, which is designed to be recharged from an external source of electrical energy.

In this category, we find electrical apparatus the power supply of which, normally provided from an external source of electrical power such as the commercial AC supply, is temporarily provided by means of a storage battery should there be a failure or dropout of the normal external power source.

Also in this category, we find electrical apparatus, which frequently is portable, and powered by storage batteries that are recharged by connection to a source of energy which is external thereof, when the apparatus is not in use.

In numerous items of apparatus, a power supply switchover device makes it possible to disconnect a storage battery from the apparatus it is powering before the storage battery becomes fully discharged, in order to prevent the apparatus and the storage battery from operating under poor conditions which can lead to faults occurring in the apparatus and to deterioration of the storage battery.

2. Description of the Prior Art

One known solution consists in measuring the voltage at the terminals of the storage battery and in disconnecting the storage battery when this voltage falls to below a predetermined threshold. However, the voltage across the terminals of a storage battery, notably the nickel-cadmium type, tends to rise again when the storage battery is disconnected from the load that it was previously powering.

If no precautions are taken, there is a danger of producing a succession of connections and disconnections of the storage battery about the threshold value chosen for cutout and, as a consequence, there is the possibility of deterioration, and faults appearing.

Moreover, it is important to be able to avoid glitches or very brief breaks in supply when changing from one source to the other, in a manner that is as simple as possible.

SUMMARY OF THE INVENTION

The present invention hence provides a power supply switchover means for electrical apparatus that associates, in a power supply, a storage battery and another source of electrical power which the storage battery is adapted to temporarily replace or interface.

According to one characteristic of the invention, it includes first and second switching means arranged in series for putting the storage battery into and out of service, by connecting or not connecting it to at least one supply terminal of the apparatus to which the other source of power is also connected, control means responsive to the supply voltage present at said supply terminal and adapted to alternatively set the first switching means to a conducting state or to a blocked state dependent upon whether the voltage present at said supply terminal is greater or not greater than a reference voltage that is a function of the minimum voltage acceptable at the terminals of the storage battery for supplying the relevant apparatus, the second switching means, being active when said first switching means are in the conducting state, being themselves blocked as long as the voltage present at said supply terminal is greater than the voltage supplied by said storage battery.

The invention also provides teleaction terminal equipment adapted to be remotely controlled via a communications network of the multiservice type to which it is connected by means of a transmitting means and a receiving means and which is powered through a power supply switchover means adapted to associate, in a power supply, a storage battery and another source of electrical power which the storage battery is adapted to temporarily replace or interface.

According to a characteristic of the invention, the teleaction equipment includes, firstly, power supply switchover means comprising first and second switching means arranged in series for putting the storage battery into and out of service, by connecting or not connecting it to at least one supply terminal of the apparatus to which the other source of power is also connected, control means responsive to the supply voltage present at said supply terminal and adapted to alternatively set the first switching means to a conducting state or to a blocked state dependent upon whether the voltage present at said supply terminal is greater or not greater than a reference voltage that is a function of the minimum voltage acceptable at the terminals of the storage battery for supplying the relevant equipment, the second switching means, being active when said first switching means are in the conducting state, being themselves blocked as long as the voltage present at said supply terminal is greater than the voltage supplied by said storage battery and, secondly, signaling means which, being connected to the transmitting means of the apparatus, are adapted to generate power supply signaling for transmission over the communications network.

The invention, its characteristics and advantages will become more clear from the description which follows taken in conjunction with the attached drawings.

Figure 1:
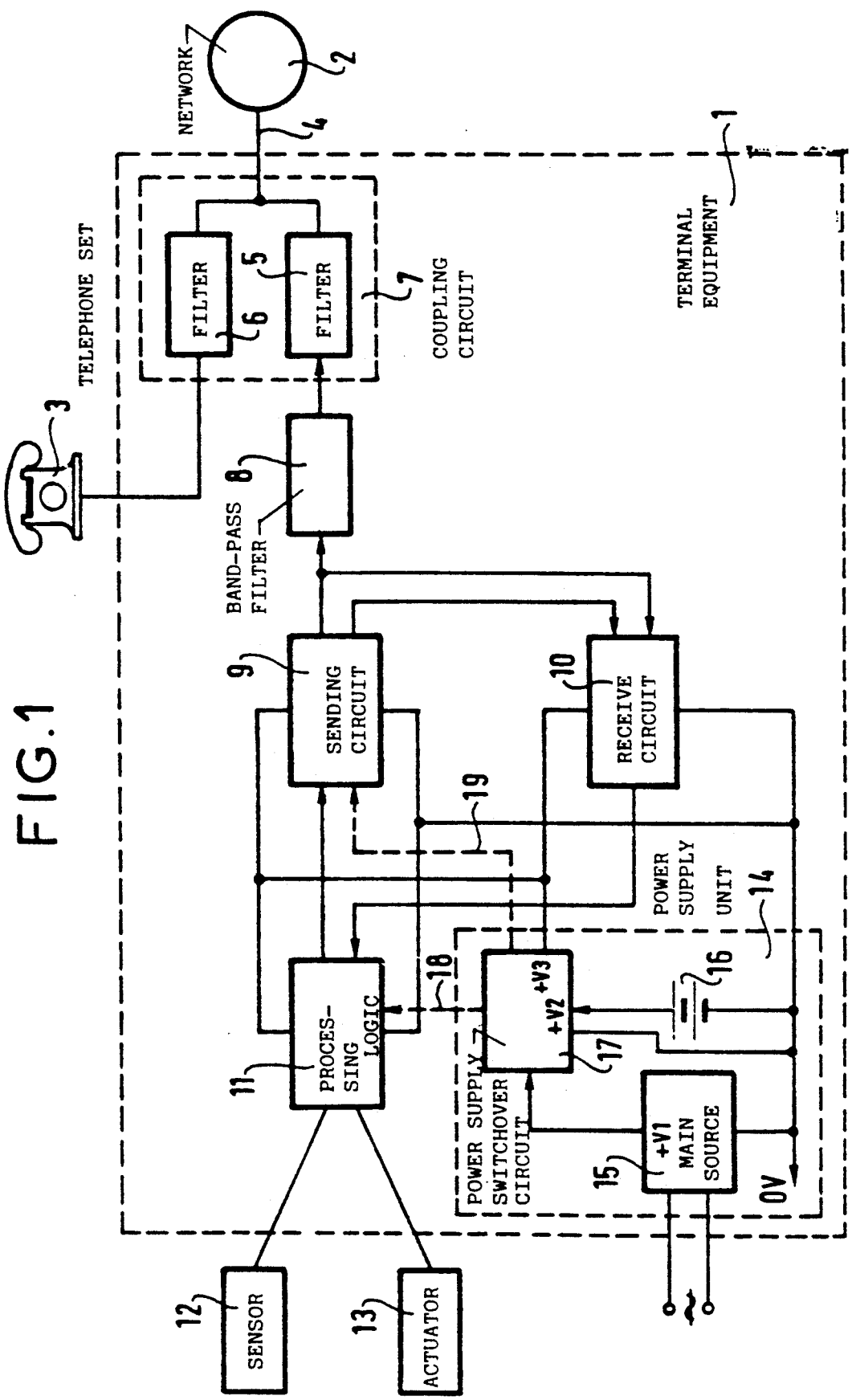
FIG. 1 is a block diagram of an item of teleaction equipment.

In a known manner, the term teleaction covers a range of diverse activities such as tele-surveillance, remote control, telemetry, remote operations management, in which there is a two-way interchange of short messages between terminal equipment and dedicated servers, mutually connected by one or more mono-service or preferably multiservice networks.

DESCRIPTION OF A PREFERRED EMBODIMENT

An item of teleaction terminal equipment 1 is for example designed for connection to a telephone and teleservice network 2 in parallel with a telephone set 3 by means of a link 4 which is used in-band by the telephone and out-of-band, or in the so-called supraphonic band, by the terminal equipment 1 for its links with the one or several servers, which themselves are connected in a known manner to the network 2 and are not shown here.

Two filters 5, 6 of a coupling circuit 7 provide conventional separation of the communications signals relating to the telephone set 3 and those relating to the terminal equipment 1, and here they are shown as being incorporated in the latter although this is not indispensable. The filter 5 that serves the terminal equipment is here shown as being connected to a bandpass filter 8 the mid-point frequency FC of which, for example, is selected to be half way between two frequencies F1 and F2 which are employed in the transmission of the communication signals in binary form from the terminal, the frequencies F1 and F2 being respectively equal, for example, to 52.3 kHz and 57.6 kHz.

The communication signals interchanged between the terminal equipment 1 and the network 2 are produced by a conventional sending circuit or transmitter 9 and received by a conventional receiver 10 incorporated in the terminal equipment. The transmitter 9 receives digital signals supplied from processing logic 11 on the basis of information supplied by sensors 12 or actuators 13 and transforms them into signals that are transmitted in dual-tone mode using the frequencies F1 and F2.

The processing logic may be simple hardwired logic or yet again a unit incorporating a microprocessor and suitably programmed memories. The sensors 12 and the actuators 13 can be of any analog or digital type.

The receiver 10 performs a transposition into the form of binary logic signals on the frequency signals transmitted over the network 2 and destined for terminal equipment 1. The items making up this equipment 1, notably the processing logic 11, the transmitter 9 and the receiver 10, are electrically powered by a power supply unit 14 which is usually backed up and which, in the example provided here, supplies a reference voltage indicated as +V3 obtained from a main source 15 or a backup battery 16, for example, of the nickel-cadmium type. The battery 16 can be charged by a circuit, which is not shown, supplied from the main source 15.

The main source 15 is, for example, a diode rectifier supplied from a commercial AC supply network and associated with a voltage dropper, which are not shown here; it supplies a direct current voltage to a power supply switchover device 17, this voltage being indicated as +V1 with respect to a 0 V reference potential.

The switchover device 17 which is further connected to the 0 V reference potential also has a voltage +V2 with respect to this 0 V potential applied to it by the storage battery 16. It supplies the power supply voltage +V3 using the voltage +V1 supplied by the main source 15 if the latter is active, or using the voltage +V2 supplied by the storage battery 16 should the main source fail or drop out.

The terminal equipment 1 is adapted to supply information signals, via the link 4, in the case of a failure affecting the main source 15 and/or the storage battery 16, for example via the switchover device 17 connected to the transmitter 9 either directly or via the processing logic 11, as indicated by the dashed lines 18 and 19.

Figure 2:
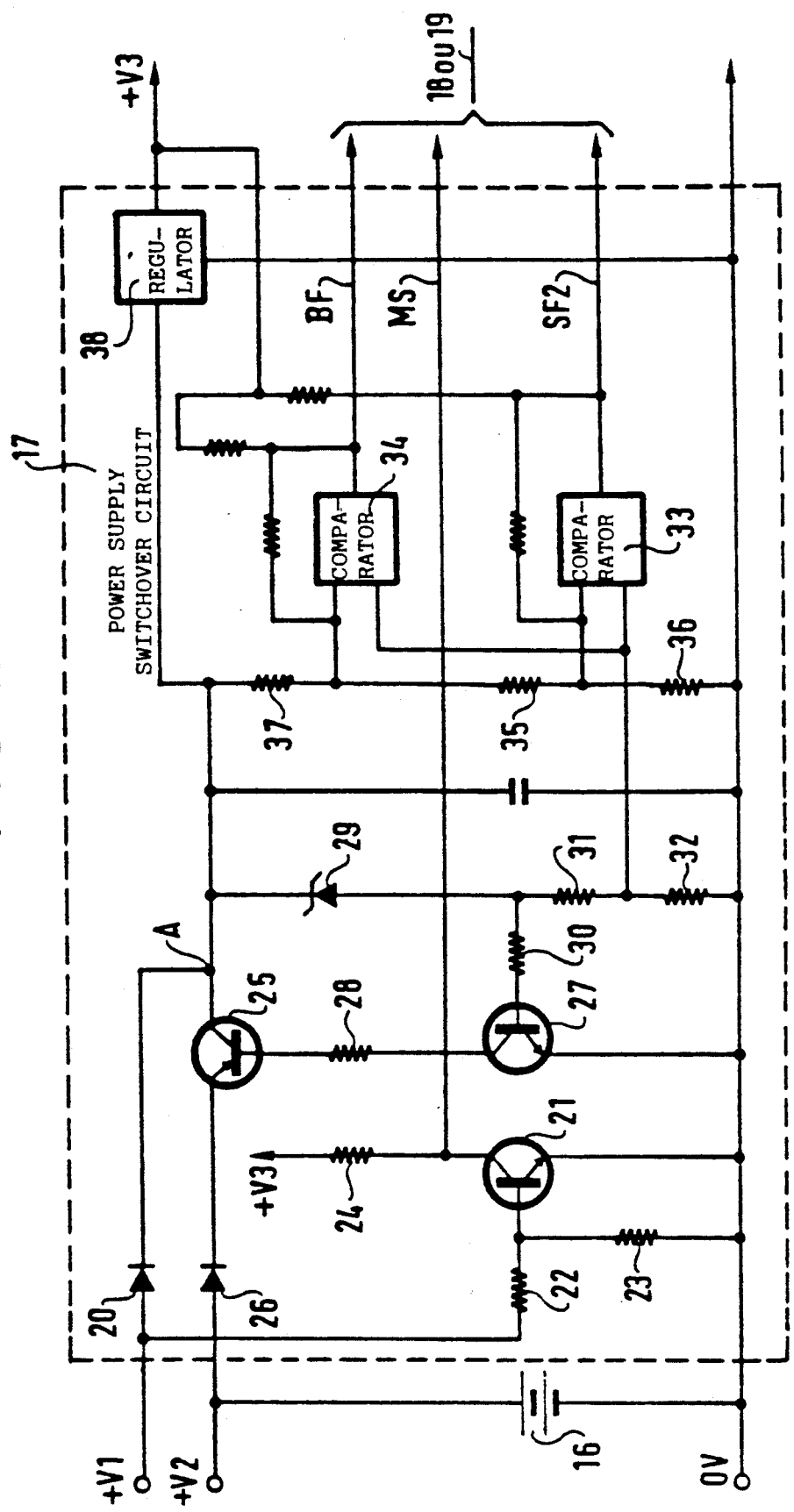
FIG. 2 is an example of a power supply switchover device in accordance with the invention.

The power supply switchover device 17 is illustrated in detail in FIG. 2. Although it is here presented in relation with teleaction terminal equipment, it is suitable for implementation in numerous items of electrical apparatus intended to be powered from a storage battery adapted to take the place of another source of powering and/or to be recharged by such a powering source, as indicated in the preamble to this present application.

To this effect, the power supply switchover device 17 is connected to the potentials 0 V, +V1, +V2, +V3.

The potential +V1 furnished by the main source 15 is applied to the anode of a diode 20, and also to the base of a NPN-type transistor 21 via a resistor 22. The transistor 21, the base of which is biassed by a resistor 23 connected to the 0 V potential, has its collector-emitter junction connected at one end to the power supply potential +V3 via a resistor 24, and at the other end to the 0 V potential so as to supply a signal MS which is characteristic of operation or nonoperation of the main source 15 destined for the transmitter 9, via one of the links 18 or 19 depending on which is in use. The signal MS is sampled at the collector of transistor 21 which passes from the 0 V potential to the +V3 potential, depending on whether the terminal equipment is powered by the main source 15 or not.

The potential +V2 supplied by the storage battery 16 is applied to the emitter of a PNP-type switching transistor 25 via a diode 26; this transistor 25 has its collector connected at point A to the cathode of the diode 20, and its base is controlled by a NPN-type transistor 27 via a resistor 28 connected to the collector of transistor 27, the emitter of which is connected to the 0 V potential. The base of transistor 27 is connected to point A and hence to the cathode of diode 20 via a Zener diode 29 and a resistor 30; the point which is common to the anode of Zener diode 29 and resistor 30 is connected to the 0 V potential by two resistors 31, 32 in series.

Through this arrangement, when the main source 15 is active, it supplies a potential +V1 to the power supply switchover device 17 which here produces the potential +V3 for powering the equipment, for example via a conventional regulator 38 connected to point A. The transistor 21 supplies signaling information and in the example given here, this is sent to the transmitter 9 of the equipment. Transistor 25 has its collector raised to the positive potential +V1 which reverse-biased Zener diode 29, transistor 27 becomes conducting and storage battery 16 is unable to supply current to the extent that the potential +V1 is greater than the potential +V2, which has the effect of blocking the diode 26.

Disappearance of the potential +V1, for example when the main source 15 is no longer supplied with power, does not cause interruption of the power supply and supposing that storage battery 16 is sufficiently charged, this latter taking the place of main source 15 by supplying the potential +V2 via transistor 25 maintained in the conducting state.

In the embodiment described here, the voltage of storage battery 16 is checked or verified through the voltage divider constituted by the resistors 31 and 32 in series with a Zener diode 29.

To achieve this, the common point of connection of resistors 31, 32 is connected to an input that is common to two comparators 33 and 34, the voltage between this common point and the point A, which is practically fixed by diode 29, acting as a reference voltage for the two comparators. The second respective inputs of these latter two are respectively connected to one of the two terminals of a resistor 35, one end of which is connected to the 0 V potential via a resistor 36, and the other end of which is connected to the point A via a resistor 37. The two comparators 33 and 34 each supply a different indication of the voltage threshold, in binary form; these respective indications marked as SF2 and BF are established for two predetermined values one of which is determined by the resistors 35 and 37 in series relative to the set of the three resistors 35, 36 and 37 in series, and the other of which is determined by resistor 37 relative to this same set of resistors.

When the voltage at the terminals of storage battery 16 reaches a minimum admissible value which is lower than the thresholds respectively fixed by comparators 33 and 34, for which the Zener diode 29 is no longer in a reverse conduction state, the latter ceases to supply the voltage divider made up by resistors 31, 32. Zener diode 29 is selected so as to perform reverse conduction for an applied reverse voltage which is greater than the minimum value of the storage battery voltage admissible for the selected application. The switching transistor 25 becomes blocked, putting the storage battery 16 out of circuit. Point A is connected to the 0 V potential by the resistors 35, 36, 37 in series and hence finds itself at this potential as long as the main source 15 does not become active again.

A possible voltage build-up in storage battery 16 which could be due to its being put out of circuit has no effect on the equipment by virtue of the blocked state of transistor 25.

This hence makes it possible to avoid the storage battery 16 becoming fully discharged as a result of repeatedly being put into and withdrawn from service and also prevents the equipment from operating under incorrect conditions, when the power supply is no longer able to be assured in a satisfactory manner. In the example discussed here, the double signaling, via comparators 33 and 34, and that initiated by the transistor 21, enable the equipment 1 to successively transmit status signals to a remote server which may for example, be able to determine if a possible break in communication is due to the equipment or to the link, which may be particularly important in certain teleaction applications.

Obviously, in an alternative embodiment, it is possible to provide an additional switching means, which is not shown, and which may be manual or remotely controlled, to enable the apparatus to be powered from the storage battery 16 in the absence of power from the main source, if this is considered to be necessary.

What is claimed is:

1. A power supply switchover device for an electrical apparatus including a first source of electrical power and a battery both connected to a common supply terminal of said apparatus (A) and to a common reference terminal (0 V) of said apparatus, said switchover device including first and second switching means for putting the battery into and out of service, each of said first and second switching means having first and second terminals and controlling conduction therebetween, said first switching means (26) having its first terminal connected to a supply terminal of said battery and having its second terminal connected to said first terminal of said second switching means (25) and being conducting when the voltage at the first terminal of said second switching means is smaller than the voltage at the supply terminal of the battery, said second switching means having its second terminal connected to said commons supply terminal (A) of said apparatus and being operated by control means (27) responsive to voltage at said common supply terminal of said apparatus for operating said first and second switching means to connect said supply terminal of said battery to said common supply terminal of said apparatus only once after each cutoff of said first source and to maintain connection of said battery supply terminal to said common supply terminal of said apparatus as long as the battery voltage is above a threshold level, said control means being driven through a biasing bridge for fixing said threshold level, said biasing bridge including a resistive link (31, 32) and a Zener diode (29), wherein the biasing bridge is connected between said common reference terminal and said common supply terminal of said apparatus and is directly connected to said second terminal of said second switching means.

2. A power supply switching device according to claim 1 wherein the second switching means comprises a switching transistor, and wherein he control means comprises a command transistor acting on the base of the switching transistor, the base of said command transistor being connected to a connection point between said Zener diode and said resistive link, and wherein said first switching means comprises a diode in series with said switching transistor.

3. A teleaction terminal equipment including a transmitter and a receiver for connection to a multiservice type communication network for remote control, wherein said terminal equipment includes a power supply switchover device including a first source of electrical power and a battery both connected to a common supply terminal (A) of said equipment and to a common reference terminal (0 V) of the equipment, said switchover device including first and second switching means for putting the battery into and out of service, each of said first and second switching means having first and second terminals and controlling conduction therebetween, said first switching means (26) having its first terminal connected to a supply terminal of said battery and having its second terminal connected to said first terminal of said second switching means (25) and being conducting when the voltage at the first terminal of said second switching means is smaller than the voltage at the supply terminal of the battery, said second switching means having its second terminal connected to the common supply terminal (A) of said equipment and being operated by control means (27) responsive to voltage at said common supply terminal of said equipment for operating said first and second switching means to connect said battery supply terminal to said common supply terminal of said equipment only once after each cutoff of said first source and to maintain connection of said battery supply terminal to said common supply terminal of said equipment as long as the battery voltage is above a threshold level, said control means being driven through a biasing bridge for fixing said threshold level, said biasing bridge including a resistive line (31, 32) and a Zener diode (29), wherein the biasing bridge is connected between said common reference terminal and said common supply terminal of said equipment and is directly connected to said second terminal of said second switching means.

4. Teleaction terminal equipment according to claim 3, wherein said second switching means comprises a switching transistor and said control means comprises a command transistor acting on the base of the switching transistor, the base of said command transistor being connected to a connection point between said Zener Diode and said resistive link, and said first switching means comprises a diode in series with said switching transistor.

5. Teleaction terminal equipment according to claim 3, further including signaling means for generating a power supply status signal over said network, said signalling means comprising a signaling transistor triggered by the supply voltage furnished by said first source and supplying a binary-type signalling at its collector.

6. Teleaction terminal equipment according to claim 3, further including at least one comparator for comparing the value of a voltage at said common supply terminal of said equipment with a predetermined reference voltage and supplying a binary-type output signal.

* * * * *